United States Patent
Seetharaman et al.

(10) Patent No.: US 11,593,188 B2
(45) Date of Patent: Feb. 28, 2023

(54) METHOD AND APPARATUS FOR PROVIDING ASYNCHRONICITY TO MICROSERVICE APPLICATION PROGRAMMING INTERFACES

(71) Applicant: VMware, Inc., Palo Alto, CA (US)

(72) Inventors: Srini Seetharaman, San Bruno, CA (US); Somdutt Brajaraj Patnaik, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 141 days.

(21) Appl. No.: 16/914,928

(22) Filed: Jun. 29, 2020

(65) Prior Publication Data
US 2021/0406102 A1    Dec. 30, 2021

(51) Int. Cl.
| | |
|---|---|
| *G06F 13/14* | (2006.01) |
| *G06F 9/54* | (2006.01) |
| *H04L 67/1095* | (2022.01) |
| *H04L 12/66* | (2006.01) |
| *H04L 67/01* | (2022.01) |

(52) U.S. Cl.
CPC .............. *G06F 9/546* (2013.01); *G06F 9/542* (2013.01); *H04L 12/66* (2013.01); *H04L 67/01* (2022.05); *H04L 67/1095* (2013.01)

(58) Field of Classification Search
CPC ......... G06F 9/546; G06F 9/542; H04L 12/66; H04L 67/1095; H04L 67/42
See application file for complete search history.

(56) References Cited

U.S. PATENT DOCUMENTS

| | | | | |
|---|---|---|---|---|
| 8,881,182 B1 * | 11/2014 | Jorgensen | ................. | G06F 9/54 719/328 |
| 9,792,163 B1 * | 10/2017 | Chrysanthakopoulos | ................... | H04L 67/42 |
| 10,949,198 B1 * | 3/2021 | Weston | ..................... | G06F 8/76 |
| 2017/0331813 A1 * | 11/2017 | Lander | ................ | H04L 63/0815 |
| 2019/0310930 A1 * | 10/2019 | Joglekar | ............. | G06F 11/3644 |
| 2020/0020421 A1 * | 1/2020 | Dimitrova | .............. | G16B 30/20 |
| 2020/0162578 A1 * | 5/2020 | Appajanna | ............. | H04L 67/32 |

OTHER PUBLICATIONS

Michael Hofmann et al. "Microservices Best Practices for Java" (Year: 2016).*
Amazon Web Services, Inc. "Set up asynchronous invocation of the backend Lambda function," Amazon API Gateway, Developer Guide, 2020, 1 page, retrieved online: https://docs.aws.amazon.com/apigateway/latest/developerguide/set-up-lambda-integration-async.html.
Amazon Web Services, Inc. "Using Amazon SNS for user notifications with a mobile application as a subscriber (mobile push)," Amazon Simple Notification Service (SNS), Developer Guide, 2020, 1 page, retrieved online: https://docs.aws.amazon.com/sns/latest/dg/sns-mobile-application-as-subscriber.html.
Richardson, Chris: "Introduction to Microservices," NGINX, May 19, 2015, 16 pages, retrieved online: https://www.nginx.com/blog/introduction-to-microservices/.

* cited by examiner

*Primary Examiner* — Andy Ho
*Assistant Examiner* — Abdou K Seye
(74) *Attorney, Agent, or Firm* — Kim & Stewart LLP (57) ABSTRACT

A method of handling an API call includes receiving a first API call from a job requestor, the first API call including a job to be executed by a microservice. The method also includes adding the job to a job queue, making a second, synchronous, API call including the job to the microservice, updating the job queue upon successful completion of the job by the microservice, and notifying the job requestor of the successful completion of the job.

17 Claims, 8 Drawing Sheets

METHOD AND APPARATUS FOR PROVIDING ASYNCHRONICITY TO MICROSERVICE APPLICATION PROGRAMMING INTERFACES

BACKGROUND

In one approach to application development, a large application is built as a suite of modular components or services, which are known as microservices. Each microservice supports a specific task or business goal and uses a simple, well-defined interface, such as an application programming interface (API).

Figure 1:
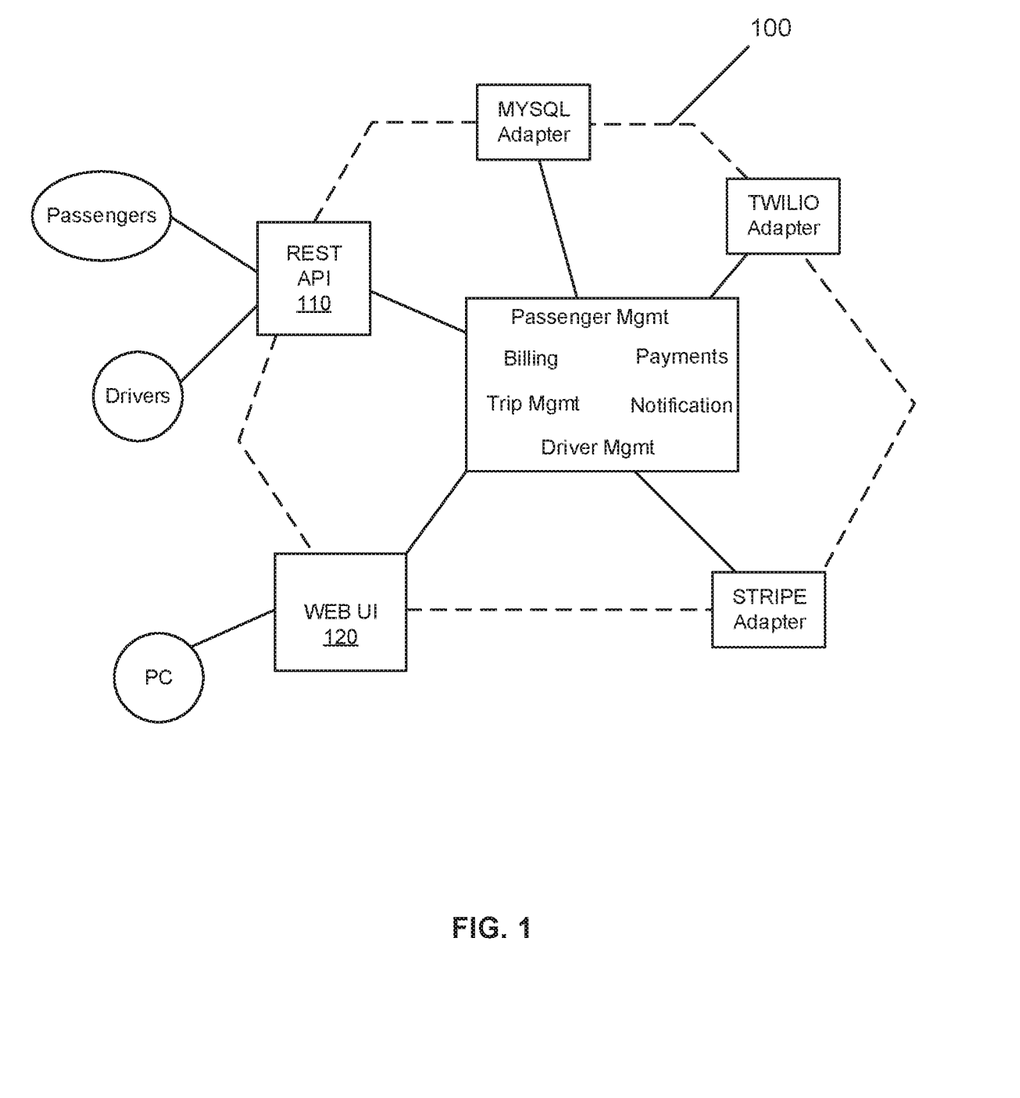
FIG. 1 is a block diagram of a monolithic compute architecture of the related art.

FIG. 1 is a block diagram of a monolithic compute architecture 100 that does not employ microservices. Monolithic compute architecture 100 provides an application stack at the core of which is the business logic, which is implemented by modules that define services, which, in the example of FIG. 1, include passenger management, billing management, trip management, driver management, payment management, and notification management. Surrounding the core are adapters that interface with the external world. Examples of adapters include database access components (My SQL adapter), messaging components that produce and consume messages (Twilio adapter), payment processing components (Stripe adapter), and web components that either expose APIs or implement a user interface (UI). In this system, passengers may operate a ride request application on his/her smartphone, to request a ride. That request is output by the ride request application as an API call, and is received by a REST (representational state transfer) API interface 110. REST API interface 110 also receives API calls from drivers who can act on the ride requests. API calls may also be received via a web user UI 120, as output by a PC, and then forwarded to the application stack of monolithic compute architecture 100 for processing.

Figure 2:
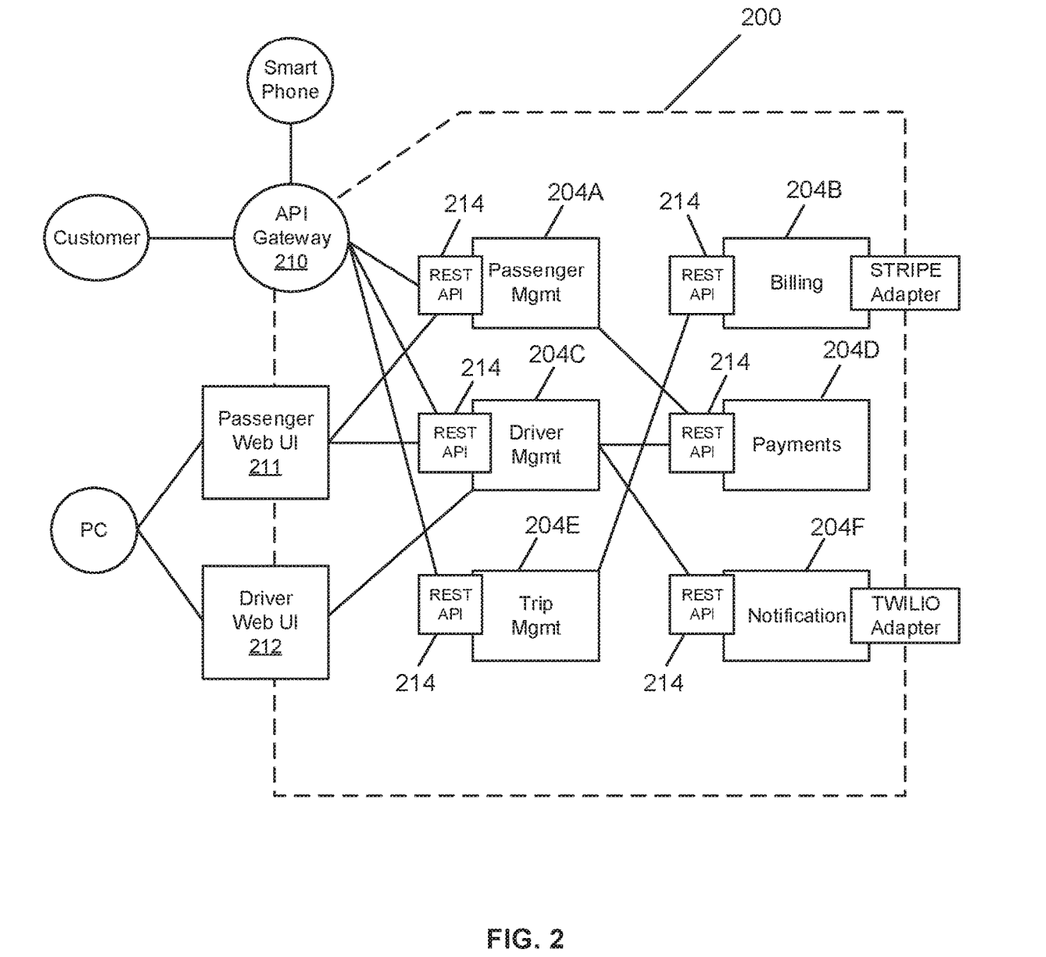
FIG. 2 is a block diagram of a modular compute architecture of the related art.

While monolithic compute architecture 100 has been useful to date, next generation cloud applications are being built using a microservice design pattern in which each monolithic application is broken down into microservices. FIG. 2 is a block diagram of a modular compute architecture 200 which employs microservices 204A-F. Each microservice 204A-F is deployed and managed independently, and includes a REST API interface 214. Modular compute architecture 200 improves the speed at which jobs are performed as compared to monolithic compute architecture 100. Furthermore, modular compute architecture 200 enables scaling out of applications in a much easier manner than monolithic compute architecture 100.

Modular compute architecture 200 also employs an API gateway 210 that receives and routes API calls to the proper microservice. API gateway 210 provides several value-added features, including: a) version-based routing of API calls to different instances of microservices, b) monitoring, tracing, and logging of API calls, c) performing authentication and authorization checks of API calls, and d) throttling of certain API calls to protect the modular compute architecture 200 from attacks, such as from distributed denial of service (DDOS) attacks.

Typically, a user triggers a function execution with a microservice through a synchronous REST API call. It is possible that the function may perform several time-consuming operations, each of which may be blocked on input/output (I/O), internal dependencies, or external dependencies. The end result of invoking a time-consuming function over a synchronous REST API call is that the caller (e.g., browser of a user's computer) will be blocked or have to wait a relatively long time for a response. This leads to poor user experience. It is also possible that an impatient user might retry the operation, which may lead to a possible data conflict with respect to the initial API call and a later API call for the same service made by the same user.

To avoid such blocking behavior and data conflict possibility, microservice developers are tending towards changing the API handler to implement an asynchronous handling logic where the user's request is logged in a job queue and the API call returns right away with a job identifier (job ID). The microservice processes the jobs in the background and updates the status when done, in an asynchronous manner. In the meantime, the caller (i.e., user's computer browser) can keep polling or register a callback to get updates on the background job. This allows the browser to do other operations while the microservice is busy processing the last request.

Figure 3:
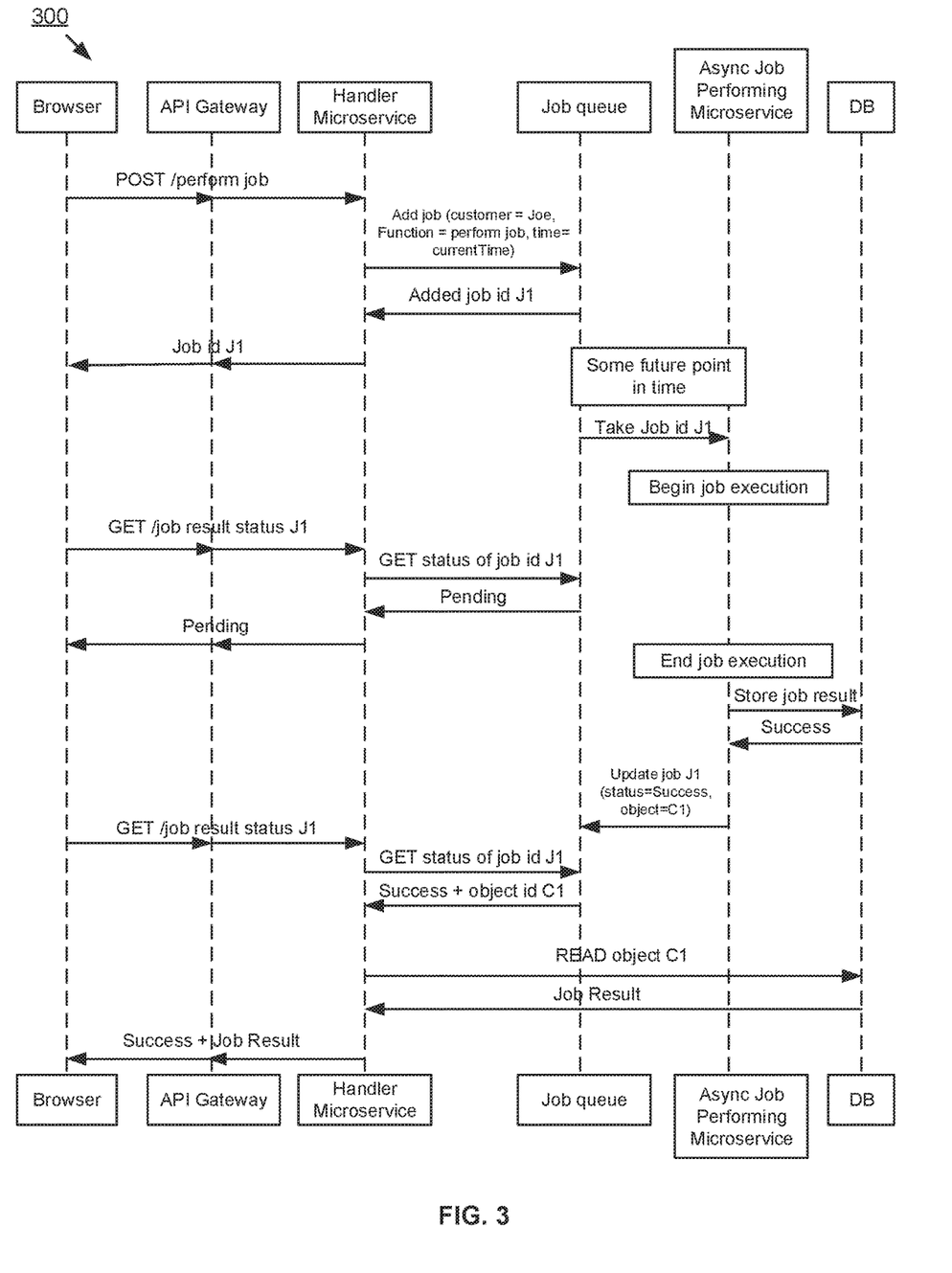
FIG. 3 is a flow diagram showing asynchronous API handling in the modular compute architecture of FIG. 2.

FIG. 3 is a workflow 300 showing an asynchronous operation performed by an asynchronous job performing microservice, based on an API call for a job to be executed by that microservice. The browser outputs a job request as an API call, which is shown in FIG. 3 as an API call, e.g., HTTP POST command. The API call is received by the API gateway, and forwarded to a handler microservice. The handler microservice parses the API call, and adds the job to a job queue with a job ID, J1, and the job ID is returned to the API gateway, which forwards it to the browser. At some point in the future, the microservice removes job J1 from the job queue, and starts executing the job. When the job execution ends, the job result is stored in a database, and the database returns a "success" signal to the microservice when the job result is successfully stored therein. The microservice then updates the job queue to indicate that job J1 has been successfully executed.

During job execution, the browser may have sent a request for a job update, as an API call, e.g., HTTP GET command, to the API gateway, which forwards that request to the handler microservice. In this example, since at the time of the job update request, the job is still executing, the job queue returns a "pending" status to the handler microservice, which forwards the "pending" status to the API gateway, which forwards it to the browser. Subsequently, when the browser sends the request for a job update after execution of job J1 has ended, the job queue returns a "success" message. In response to the "success" message, the handler microservice accesses the database to read the job result. Upon receiving the job result from the database, the handler microservice forwards the "success" message and the job result to the API gateway, which forwards them to the browser.

As can be seen from the workflow shown in FIG. 3, implementing an asynchronous REST API call handling logic adds complexity into each microservice. Such complexity includes the need to support additional capabilities such as: a) scheduling jobs that have been queued in a job queue, b) updating relevant job status, c) retrying failed jobs (either because of fault of other transient issues), d) provide visibility into progress of all pending jobs, and e) provide visibility (either partially or fully) into failed jobs.

SUMMARY

One or more embodiments provide advantages of an asynchronous API handler without the complex code implementation required for modular compute architectures of the related art. In the embodiments, asynchronous handling of microservice APIs is performed at the API gateway layer that includes an API gateway and an asynchronizer component. As a result, microservices that execute jobs can remain simple.

One or more embodiments comprise a method of handling an API call, which includes receiving a first API call from a job requestor, the first API call including a job to be executed by a microservice. The method also includes adding the job to a job queue, making a second, synchronous, API call including the job to the microservice, updating the job queue upon successful completion of the job by the microservice, and notifying the job requestor of the successful completion of the job.

Further embodiments include, without limitation, a non-transitory computer-readable storage medium that includes instructions for a processor to carry out the above method, and a computer system that includes a processor programmed to carry out the above method.

DETAILED DESCRIPTION

Figure 4:
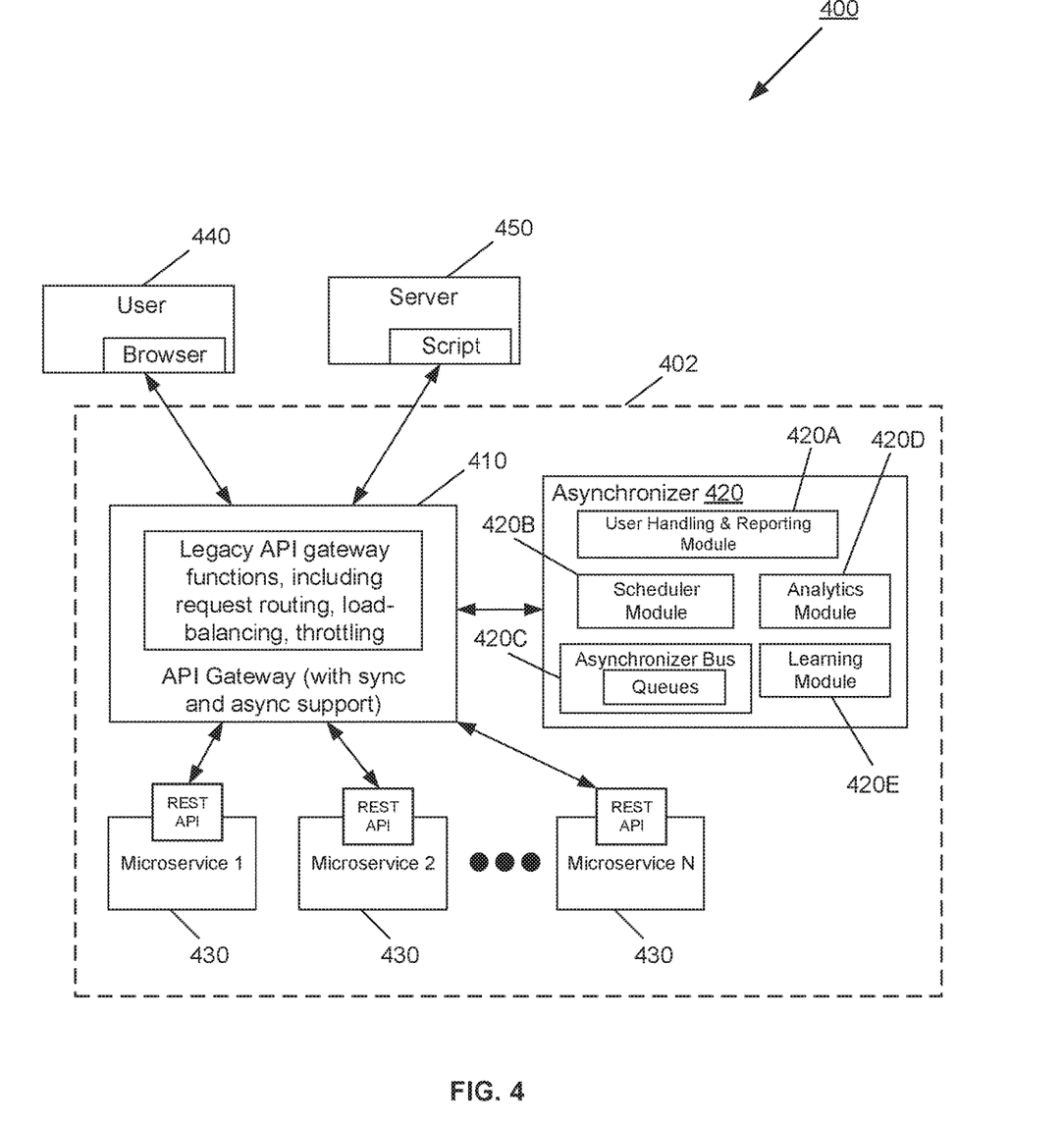
FIG. 4 is a block diagram of compute architecture that implements synchronous and asynchronous API handling according to an embodiment.

FIG. 4 is a block diagram of compute architecture that implements synchronous and asynchronous API handling according to an embodiment.

FIG. 4 is a block diagram of a compute architecture 400 showing an API gateway 410 communicatively connected to an asynchronizer 420 that implements the asynchronous handling logic according to one or more embodiments, and microservices 430, the functions of which are triggered by a REST API call. API gateway 410, asynchronizer 420, and microservices 430 are provided within a cloud service 402 accessible via the Internet. In one embodiment, microservices 430 are implemented as virtual machines (VMs) spun up on one or more hosts (i.e., servers) within cloud service 402.

Asynchronizer 420 may be provided as a module plug-in to API gateway 410. In this configuration, asynchronizer 420 snoops all requests provided to API gateway 410. Further, in FIG. 4, microservices 430 expose synchronous REST APIs, and so their code is much less complex than would be required if they were to implement asynchronous job handling logic.

As shown in FIG. 4, API gateway 410 performs standard API gateway functions such as API request routing, load balancing, and throttling. Asynchronizer 420 implements the asynchronous handling logic for API gateway 410. Asynchronizer 420 snoops all inputs made by users 440 (via commands provided by way of a browser on a user computer, for example) and servers 450 (via a script corresponding to a job request) to API gateway 410 as API calls, and provides the following functions: a) handling and validation for each API call, b) providing notifications (push notifications and pull notifications) of the job status, c) providing authorization for status callbacks, d) learning to adapt some API calls to become asynchronous, e) providing visibility into job status and dead queues, and f) retrying a webhook notification if a job fails.

In the embodiment illustrated in FIG. 4, asynchronizer 420 includes the following software components: a) user handler and reporting module 420A, b) scheduler module 420B, c) asynchronizer bus 420C, d) analytics module 420D, and e) learning module 420E. Each of these modules will be discussed in detail below.

User handler and reporting module 420A handles the API calls made to API gateway 410 and determines whether the request should be handled synchronously or asynchronously. Once the request is determined to be handled asynchronously, user handler and reporting module 420A returns a HTTP 202 'Accepted' code to the user 440 (e.g., to the user's browser), via API gateway 410. User handler and reporting module 420A is also responsible for terminating client APIs upon returning the HTTP 202 'Accepted' code. The termination of an API call may also include a job query Uniform Resource Locator (URL) (which provides job status information) or POST a message to a webhook provided by the caller with the API call.

User handler and reporting module 420A also provides a validation function for performing basic validation of API calls. For example, a URL associated with a webhook, request query parameters, body of a request, and headers of a request can be statically validated within user handler and reporting module 420A.

User handler and reporting module 420A further provides a fault tolerance function. For example, in a situation in which a user loses an API response object and wants to get it back again, the user can call user handler and reporting module 420A (via a call to API gateway 410 that is snooped by asynchronizer 420) with the same job ID to get the response object back. This object is cached in the job queue until explicitly requested to be removed by the user.

Scheduler module 420B of asynchronizer 420 detects a long running synchronous API call and spins it off as an asynchronous job that can be tracked through its entire lifecycle. Scheduler module 420B provides a status function, by which API calls can be queried for status. Since scheduler module 420B tracks jobs, it also provides status of the jobs at the time of query using a status poll REST endpoint. Scheduler module 420B further provides a request function, by which scheduler module 420B spins off a worker routine (e.g., creates an instance for a worker routine) to make API calls to a target microservice. Scheduler module 420B further provides a retrying function, by which scheduler module 420B manages job retries if a webhook specified in the API call fails or times out. Scheduler module 420B also includes a callback function, by which scheduler module 420B spins off a worker routine (e.g., creates an instance for a worker routine) to provide notification on status of the API calls when there is a change in the status of a job.

Asynchronizer bus 420C of asynchronizer 420 includes one or more queues (i.e., one or more ingress queues and one or more egress queues), as shown by the box labeled 'queues' in FIG. 4. Ingress and egress queues contain messages with a request/job/trace ID so that the status of a job may be tracked. At any time, the existence of a job in an ingress or egress queue can be queried. Asynchronizer bus 420C provides a job state function for storing a state associated with the jobs. Asynchronizer bus 420C also provides a response message function for storing results (i.e., API responses from target microservice) along with the job IDs until explicitly cleared by the user. Asynchronizer bus 420C further provides a 'dead letter' queue for API requests that never completed or that have timed out. Asynchronizer bus 420C still further provides a callback function, which works with scheduler module 420B in delivering a callback (i.e., push) notification to the user (via API gateway 410) to give an update on the status as well as the response object if ready.

The remaining two software components of asynchronizer 420 will be described below in the description of FIG. 5.

Figure 5:
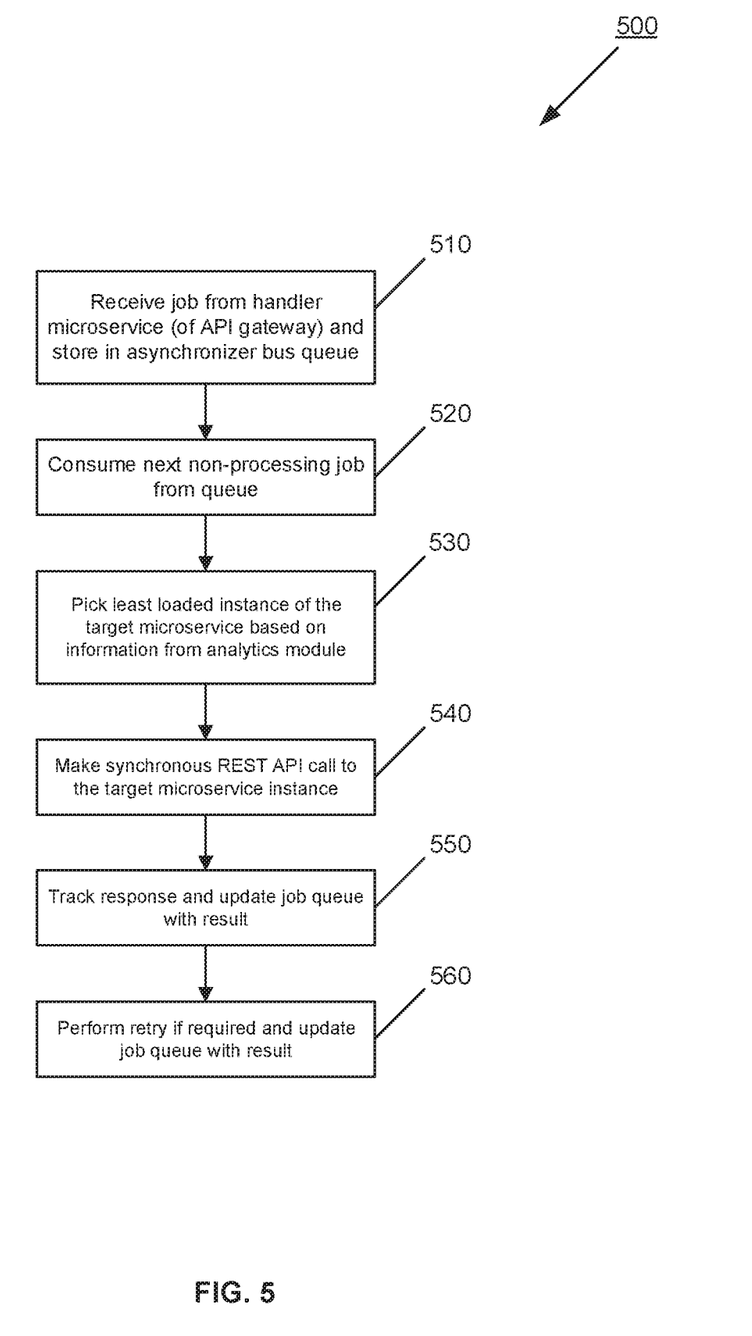
FIG. 5 is a flow diagram of steps performed by an asynchronizer component of the compute architecture of FIG. 4 to perform asynchronous API handling.

FIG. 5 is a flow diagram of steps performed by an asynchronizer component of the compute architecture of FIG. 4 to perform asynchronous API handling.

In particular, FIG. 5 is a flow diagram 500 showing the sequence of operations performed by scheduler module 420B in cooperation with asynchronizer bus 420C, according to one or more embodiments.

In step 510, scheduler module 420B is notified of a job received from user handler and reporting module 420A and stored in a queue within asynchronizer bus 420C. In step 520, scheduler module 420B consumes the next non-processing job from the queue. In step 530, scheduler module 420B picks a least loaded instance of a target microservice based on analytics provided by analytics module 420D of asynchronizer 420. In step 540, scheduler module 420B causes the handler microservice to make a synchronous REST call to the least loaded instance of the target microservice. In step 550, scheduler module 420B tracks responses provided by the target microservice, and updates the job queue with the result. In step 560, scheduler module 420B performs a job retry if necessary, and updates the job queue with the result provided by the target microservice.

Analytics module 420D of asynchronizer 420 tracks the time that a request spends in a queue in the asynchronizer bus 420C after it has been requested by a user, and thereby determines a response time for an API call. When a response time exceeds an acceptable amount, such as 15 seconds or longer, asynchronizer 420 may handle a similar type of request, in a future API call, asynchronously, to make the user experience better. Analytics module 420D also tracks trends of API call metrics over time in a "datalake" (e.g., a repository of data stored in its natural format, such as object blobs or files), and performs queries to determine trends by using plotting and trending tools. That way, analytics module 420D provides a single-pane of glass view of all asynchronous API calls ongoing in the system and tracks any that are stuck in a dead queue. Analytics module 420D also feeds the data to a learning module 420E, which is described below.

Learning module 420E provides mathematical modelling using Machine Learning (ML) techniques, such as k-means clustering, to classify unlabeled API requests into categories that enable asynchronizer 420 to better decide whether a requested API needs to be handled synchronously or asynchronously. Learning module 420E performs machine learning on outputs from analytics module 420D to improve the end-user experience. For example, load balancer scheduling typically works best for short-lived requests. However, if some requests can take too long for a response to be provided, it may overwhelm that instance of the microservice to send more requests than it can handle. To deal with this issue, learning module 420E can also be used to help regulate the number of requests outstanding at each microservice. A caller, such as a user's browser, should be able to handle a response that may correspond to a synchronous API call and an asynchronous API call. This duality may require the returned response to have a placeholder for the response object as well as the job ID. In some embodiments, the learning module 420E may cluster groups of API calls into categories of behavior, to determine whether to make API call handling asynchronous or synchronous. The learning module 420E provides feedback to user handler and reporting module 420A, to thereby enable asynchronizer 420 to use the most current information when deciding whether to handle incoming API calls synchronously or asynchronously.

Figure 6:
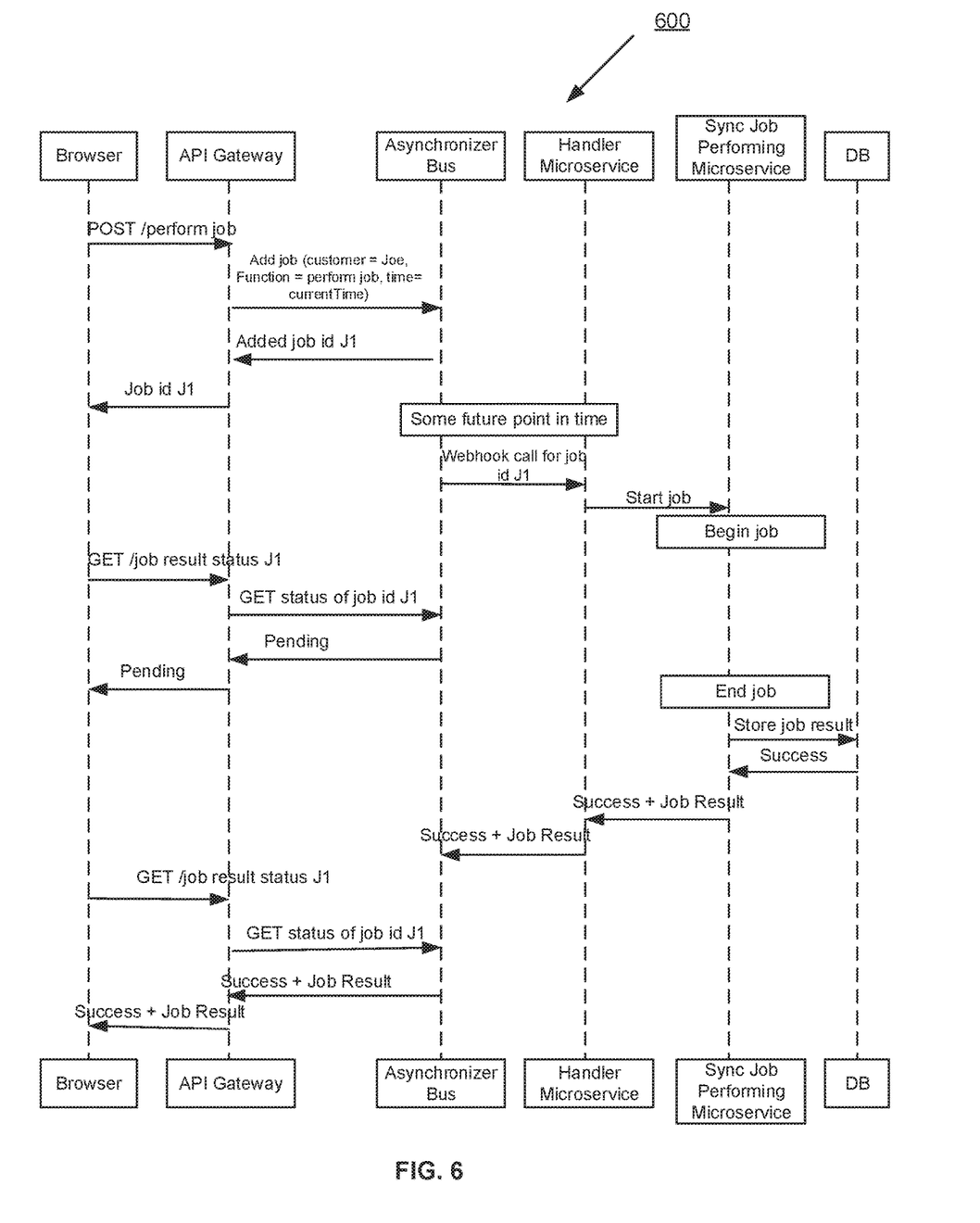
FIG. 6 is a flow diagram showing asynchronous API handling that employs pull notification.

FIG. 6 is a flow diagram showing asynchronous API handling that employs pull notification. API gateway 410 together with asynchronizer 420 implement asynchronous handling logic using synchronous microservices 430 to perform jobs asynchronously.

In the workflow 600 of FIG. 6, the user/browser (see user 440, or server 450 in FIG. 4, for example) outputs a request for a service, e.g., an API call in the form of an HTTP "POST" command. That request is received by API gateway 410. Asynchronizer 420 snoops all messages input to API gateway 410 and stores jobs in a job queue of asynchronizer bus 420C. API gateway 410 transmits a job ID for a job, e.g., job J1, to be added to the job queue. Asynchronizer bus 420C adds job J1 to the job queue, and notifies API gateway 410 that the job ID has been added to the job queue. API gateway 410 accordingly notifies user/browser (see user 440 in FIG. 4) that job J1 has been added to the job queue.

At some later point in time, handler microservice, which operates as a fully synchronous microservice, receives a webhook call from scheduler module 420B regarding the job J1 in the job queue. Synchronous job performing microservice, which also operates as a fully synchronous microservice to handle job J1, accepts job J1 from the handler microservice, and starts job J1. Upon completion of job J1, synchronous job performing microservice stores the job result in database DB, and database DB notifies synchronous job performing microservice of the successful storage of the job result in database DB. In the embodiments, database DB may be a component of API gateway 410 or a component of asynchronizer 420 that is accessible by job performing microservice, or it may be a separate storage component.

Subsequently, the synchronous job performing microservice informs the handler microservice of the successful performance of the job, and the handler microservice accordingly notifies asynchronizer bus of the successful performance of the job.

In the example of FIG. 6, prior to the successful completion of the job, user/browser outputs another request, as an API request, e.g., HTTP "GET" command, to API gateway 410, for the status of job J1. At that time, the job had not been completed, and API gateway 410 obtains the status that the job is pending and not completed from asynchronizer bus 420C. API gateway 410 forwards the "pending" job status to the user/browser.

When the user/browser outputs an API request for the status of job J1 to API gateway 410 after the job J1 has been successfully completed and after asynchronizer bus 420C has been notified of the successfully completion of job J1, API gateway 410 is notified of the successful completion of job J1 and the job result, shown as "success+job result" in FIG. 6. API gateway 410 then transmits this same information to the user/browser.

Figure 7:
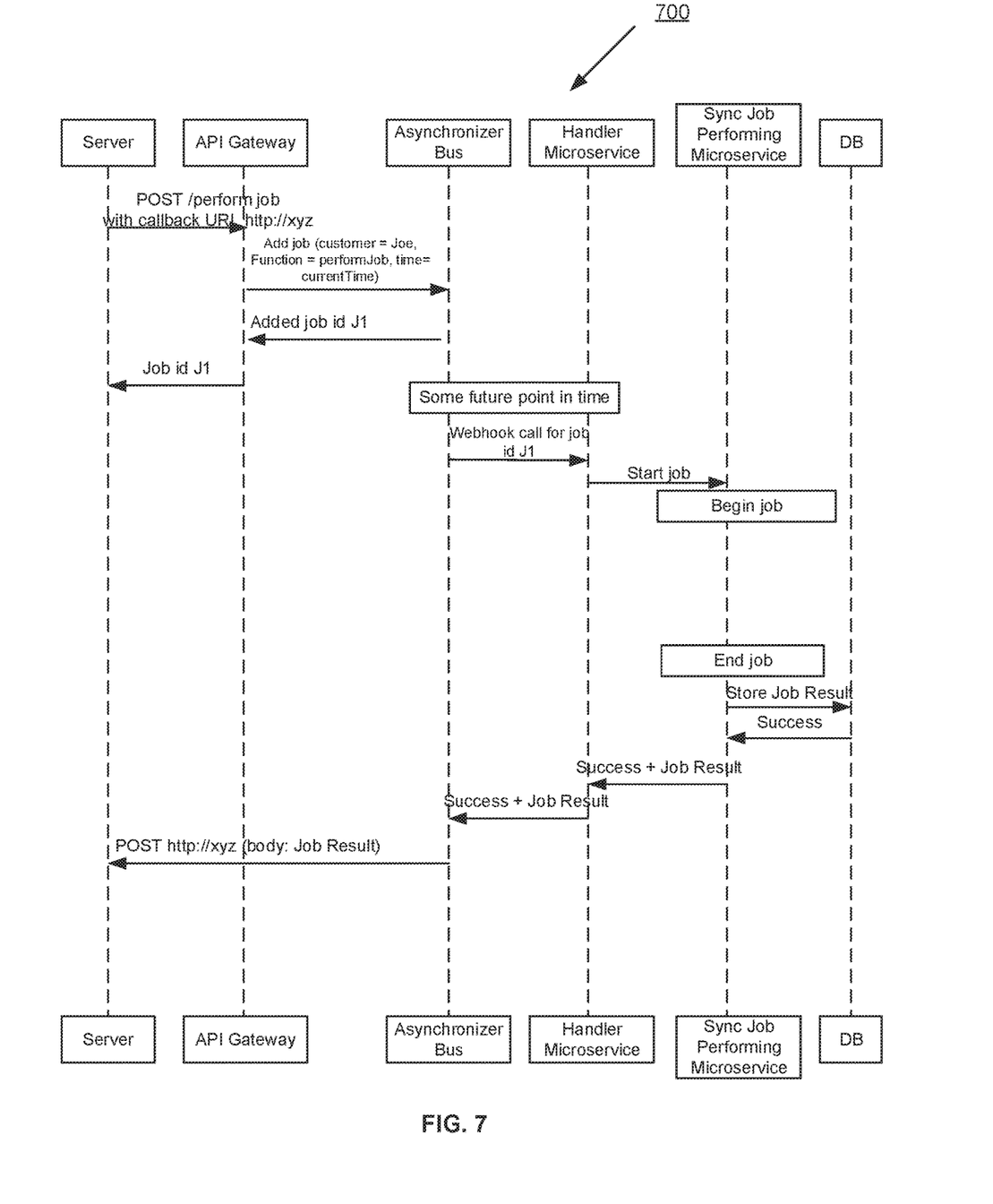
FIG. 7 is a flow diagram showing asynchronous API handling that employs push notification.

FIG. 7 is a flow diagram showing asynchronous API handling that employs push notification. API gateway 410 together with asynchronizer 420 implement asynchronous handling logic using synchronous microservices 430 to perform jobs asynchronously.

In the workflow 700, the caller is a server, and the server sends an HTTP "POST" command with callback URL 'http:xyz' to API gateway 410. Once job J1 has been completed, asynchronizer bus 420C provides the job result to the callback URL 'http:xyz' as a push notification to the server. Accordingly, in this embodiment, the server can obtain the job result without having to ask for it periodically, such as in the workflow 600 shown in FIG. 6.

Figure 8:
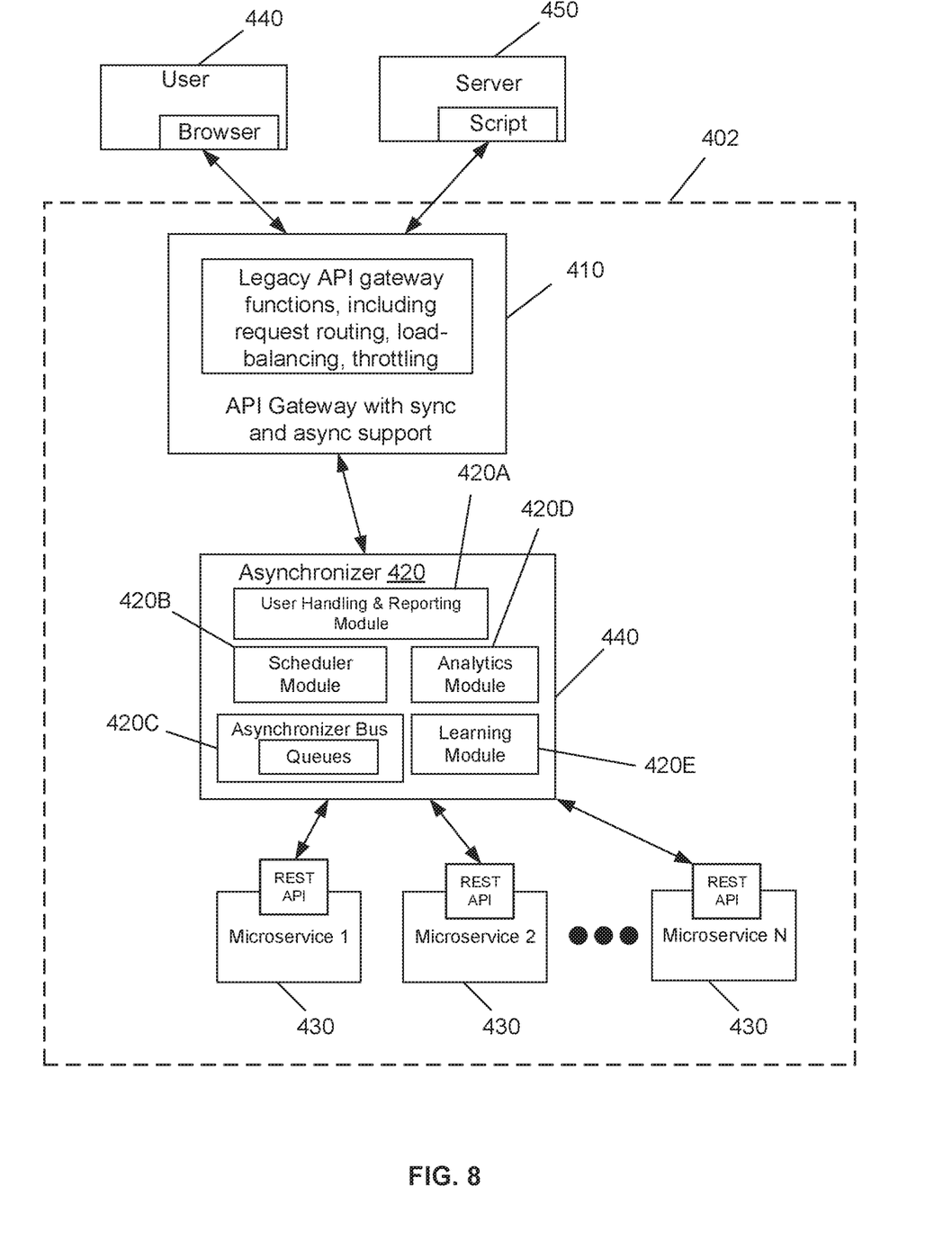
FIG. 8 is a block diagram of compute architecture that implements synchronous and asynchronous API handling according to another embodiment.

FIG. 8 is a block diagram of a compute architecture 402 that implements synchronous API handling and asynchronous API handling according to another embodiment.

In compute architecture 402 as shown in FIG. 8, instead of implementing asynchronizer 420 as a plug-in to API gateway 410, such as in the embodiment of FIG. 4, asynchronizer 420 is executed on a proxy server 440 between API gateway 410 and microservices 430. This embodiment may employ one of two different techniques for calling microservices 420. In the first technique, asynchronizer 420 hair-pins back to API gateway 410, i.e., accesses API gateway 410 for API gateway 410 to make the API call to microservices 430. In the second technique, asynchronizer 420 sends the API call directly to microservices 430.

According to one or more embodiments, an asynchronizer gateway, which includes API gateway 410 and asynchronizer 420, provides for a seamless transform of API calls from synchronous to asynchronous. This enables the use of simple synchronous microservices, while at the same time providing quick, asynchronous responses to a user with respect to a job that they submitted to the API gateway via an API call. While API calls are shown as REST API calls, different types of API calls may be envisioned while remaining within the spirit and scope of the invention, such as the use of Google Remote Procedure Calls (GRPCs).

Also, while not described in detail above, the process by which a microservice may be made aware of jobs in the job queue (asynchronizer bus) may be performed in any of a variety of ways, such as by use of RabittMQ open source message broker, which calls a consume API, and gets the object and the metadata associated therewith.

As explained above, asynchronous microservices require additional code to perform functions not required for synchronous microservices, such as checking on jobs in a job queue, checking if a queue has gone down, which are functions that are not directly related to actually performing the microservice e. Such additional code for asynchronous handling is not required to be added to the code for the microservice in the embodiments.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible, with respect to the embodiments described herein. For example, plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

What is claimed is:

1. A method of handling an application programming interface (API) call, comprising:

receiving a first API call that has been made to a synchronous microservice, from a job requestor, the first API call specifying a job to be executed by the synchronous microservice;

determining whether or not the first API call is to be handled asynchronously;

upon determining that the first API call is to be handled asynchronously, adding the job specified in the first API call to a job queue and notifying the job requestor that the job has been added to the job queue, wherein the job queue includes a plurality of jobs to be executed by different synchronous microservices and a status indication of each of the jobs;

making a second API call specifying the job that has been added to the job queue, to the synchronous micro service;

updating the job queue upon successful completion of the job by the synchronous microservice; and notifying the job requestor of the successful completion of the job.

2. The method of claim 1, wherein the first API call includes a callback uniform resource locator (URL), and the job requestor is notified of the successful completion of the job by posting of a notification of the successful completion of the job to the URL.

3. The method of claim 2, wherein the job requestor is a server, and the URL is a URL of the server.

4. The method of claim 1, wherein the job requestor is notified of the successful completion of the job in response to a request for a job status received from the job requestor.

5. The method of claim 4, wherein the job requestor is a browser, and the request for the job status is a third, synchronous, API call received from the browser.

6. The method of claim 1, further comprising:

determining which of the different synchronous microservices that are available is least loaded, wherein the second API call is made when the synchronous microservice targeted by the second API call is the least loaded.

7. A non-transitory computer-readable medium storing instructions that, when executed by one or more processors, cause an apparatus to:

receive a first application programming interface (API) call that has been made to a synchronous microservice, from a job requestor, the first API call specifying a job to be executed by the synchronous microservice;

determine whether or not the first API call is to be handled asynchronously;

upon determining that the first API call is to be handled asynchronously, add the job specified in the first API call to a job queue and notify the job requestor that the job has been added to the job queue, wherein the job queue includes a plurality of jobs to be executed by different synchronous microservices and a status indication of each of the jobs;

make a second API call specifying the job that has been added to the job queue, to the synchronous microservice;

update the job queue upon successful completion of the job by the synchronous micro service; and notify the job requestor of the successful completion of the job.

8. The non-transitory computer-readable medium of claim 7, wherein the first API call includes a callback uniform resource locator (URL), and the job requestor is notified of the successful completion of the job by posting of a notification of the successful completion of the job to the URL.

9. The non-transitory computer-readable medium of claim 8, wherein the job requestor is a server, and the URL is a URL of the server.

10. The non-transitory computer-readable medium of claim 7, wherein the job requestor is notified of the successful completion of the job in response to a request for a job status received from the job requestor.

11. The non-transitory computer-readable medium of claim 10, wherein the job requestor is a browser, and the request for the job status is a third, synchronous, API call received from the browser.

12. The non-transitory computer-readable medium of claim 7, wherein the instructions, when executed by the one or more processors, further cause the apparatus to:

determine which of the different synchronous microservices that are available is least loaded, wherein the second API call is made when the synchronous microservice targeted by the second API call is the least loaded.

13. A computer system, comprising:

an application programming interface (API) gateway;

an asynchronizer server communicatively connected to the API gateway; and at least one synchronous microservice communicatively connected to the asynchronizer server, wherein when the API gateway receives a first API call that has been made to the at least one synchronous microservice, from a job requestor, the first API call specifying a job to be executed by the at least one synchronous microservice, the asynchronizer server performs the steps of:

determining whether or not the first API call is to be handled asynchronously;

upon determining that the first API call is to be handled asynchronously, adding the job specified in the first API call to a job queue and notifying the job requestor that the job has been added to the job queue, wherein the job queue includes a plurality of jobs to be executed by different synchronous microservices and a status indication of each of the jobs;

making a second API call specifying the job that has been added to the job queue, to the at least one synchronous microservice;

updating the job queue upon successful completion of the job by the at least one synchronous microservice; and notifying the job requestor of the successful completion of the job.

14. The computer system of claim 13, wherein the first API call includes a callback uniform resource locator (URL), and the job requestor is notified of the successful completion of the job by the API gateway posting a notification of the successful completion of the job to the URL.

15. The computer system of claim 13, wherein the job requestor is notified of the successful completion of the job in response to a request for a job status received by the API gateway as output from the job requestor.

16. The computer system of claim 13, wherein the asynchronizer server is in a communication path between the API gateway and the at least one synchronous microservice, and the asynchronizer server sends the second API call directly to the at least one synchronous microservice.

17. The computer system of claim 13, wherein the asynchronizer server further performs the step of:

determining which of the different synchronous microservices that are available is least loaded, wherein the second API call is made when the at least one synchronous microservice targeted by the second API call is the least loaded.

\* \* \* \* \*